United States Patent [19]

Rolleigh et al.

[11] 4,222,114

[45] Sep. 9, 1980

[54] CYLINDRICAL ARRAY RADIATOR

[75] Inventors: Richard L. Rolleigh, Conway, Ark.; James G. Pruitt, Autsin; Robert H. Stokes, Leander, both of Tex.

[73] Assignee: The United States of America as represented by the Secretary of the Navy, Washington, D.C.

[21] Appl. No.: 763,173

[22] Filed: Jan. 27, 1977

[51] Int. Cl.² ......................... G01S 9/68; H04R 17/00

[52] U.S. Cl. ..................................................... 367/153

[58] Field of Search ............... 343/753, 754, 755, 909, 343/910, 911 R; 367/153, 155

*Primary Examiner*—Eli Lieberman

*Attorney, Agent, or Firm*—R. S. Sciascia; W. Thom Skeer; D. R. Mollick

[57] ABSTRACT

A cylindrical array radiator that reduces the intensity of energy radiated in undesirable directions. The radiator is constructed so that vertical staves placed on the face of a cylinder are staggered in the vertical direction by a predetermined distance to cancel energy in the undesirable directions.

3 Claims, 5 Drawing Figures

CYLINDRICAL ARRAY RADIATOR

BACKGROUND OF THE INVENTION

The present invention relates to cylindrical array radiators, and more particularly to a cylindrical array radiator with staggered vertical staves.

There are two conventional techniques for reducing the undesirable vertical side lobes created by unphased cylindrical arrays. The first method is to baffle the array in the vertical direction. In many applications the baffle is limited in size, and thus effectiveness, due to installation requirements. Often the acoustic properties of the baffle depend on pressure, thereby limiting the general usefulness of this technique for underwater acoustic arrays.

Cylindrical arrays are often constructed by placing vertical staves on the face of a cylinder. The second conventional techniques of reducing undesirable vertical side lobes is to design each stave to have very low vertical side lobe levels. In many applications this technique involves relatively complicated design of the individual staves and adds to the complexity of the associated electrical wiring. This problem is compounded by the fact that the vertical side lobe levels of the entire array are generally significantly higher than the vertical side lobe levels of each individual stave. This causes a vertical side lobe level of the entire array which is greater than the vertical side lobe level of an individual stave.

The major disadvantage of both techniques is that they add to the size and complexity of the cylindrical array radiator.

SUMMARY OF THE INVENTION

Accordingly, the present invention provides a cylindrical array radiator having vertical staves on the circumference of a cylinder. The staves are staggered alternately in the vertical direction by an amount $\Delta z$ so that every stave is either $\Delta z$ higher or $\Delta z$ lower than the two adjacent staves. $\Delta z$ is chosen such that $\Delta z \sin \theta = \lambda/2$, where $\theta$ is the angle of an undesirable side lobe and $\lambda$ is the wavelength of the radiated energy. The result is cancellation of the undesirable side lobe.

DESCRIPTION OF THE PREFERRED EMBODIMENT

Figure 1:
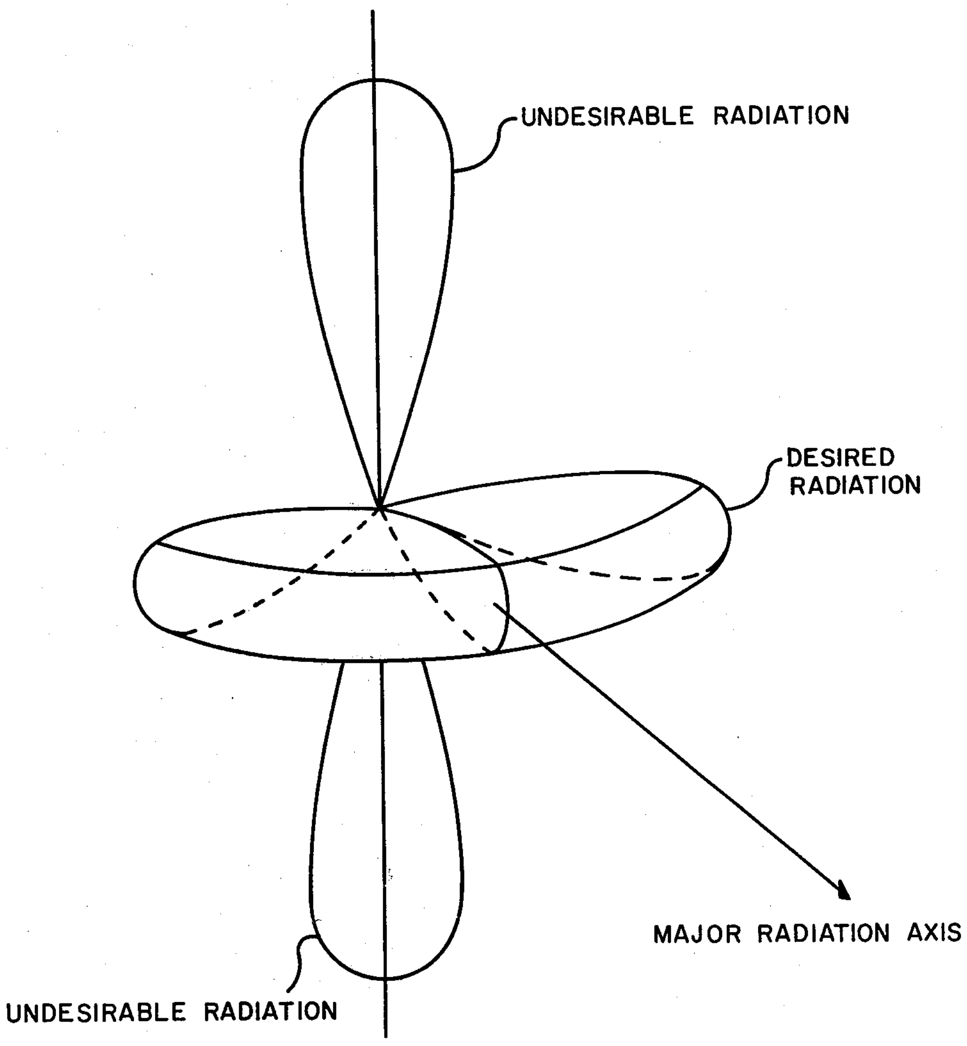
PRIOR ART Fig. 1
FIG. 1 is a perspective view of the radiation pattern from a prior art cylindrical array radiator.
Figure 2:
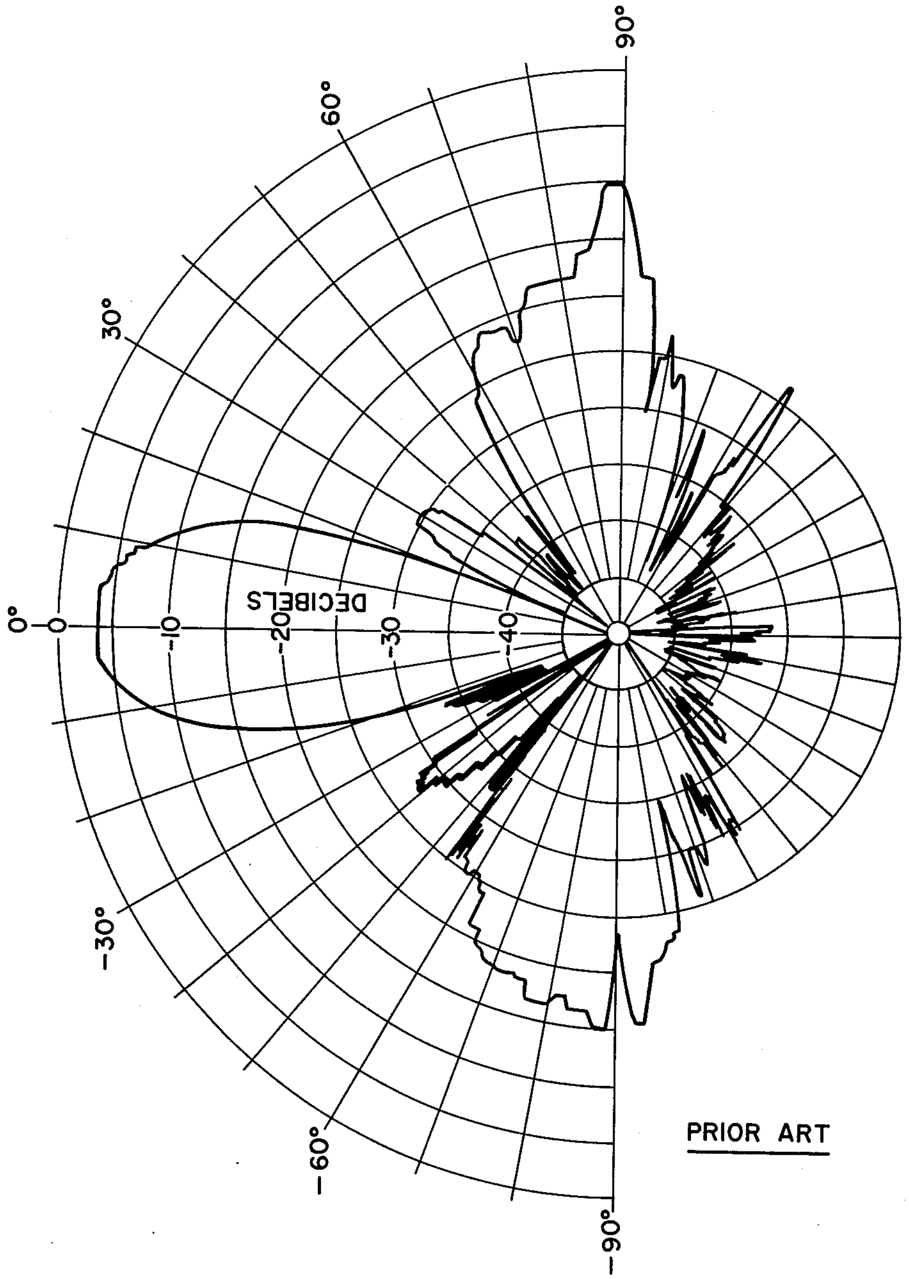
FIG. 2 is the plot of the vertical beam pattern of a prior art cylindrical array radiator.

For a cylindrical array radiator the desirable radiation is along the major radiation axis in the horizontal plane as indicated in FIG. 1. However, undesirable radiation occurs along the vertical axis due to the additive effects of the vertical side lobes of each individual stave of the array. FIG. 2 shows a typical vertical beam pattern of such a cylindrical array radiator.

Figure 3:
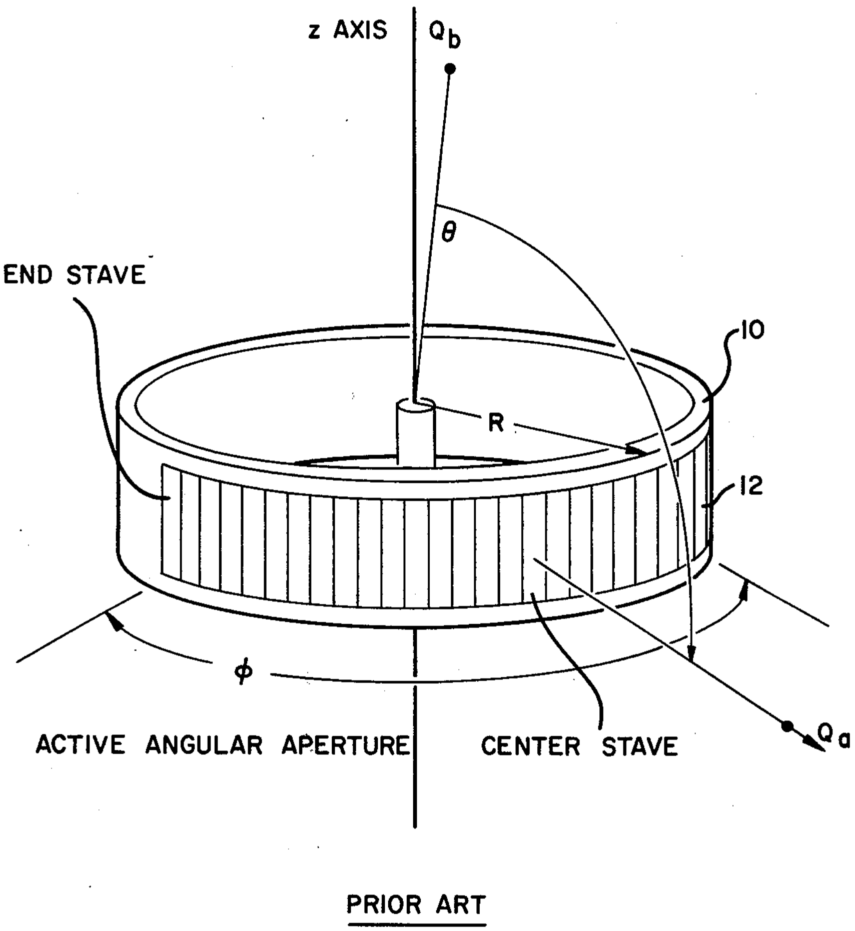
FIG. 3 is a perspective view of a prior art cylindrical array radiator.

Referring now to FIG. 3, a prior art cylindrical array radiator has a housing 10 upon the circumference of which are mounted a plurality of vertical staves 12. Consider an observation point, $Q_a$, on the major radiation axis, the distance from the point, $Q_a$, to each of the end staves is greater than the distance from $Q_a$ to the center stave. The relative distance is given by:

$$\Delta 1_a = R(1 - \cos \phi/2)$$

where R is the radius of the cylinder and $\phi$ is the active angular aperture of the array. If this distance is as large as several wavelengths, then the energy contributions from different staves will not in general have the same phase. This is because relative phase is determined by relative travel time, which is determined by relative distance to the observation point. Since the total amplitude at any point is the sum of the contributions from each stave, the total amplitude at $Q_a$ is reduced because all of the staves do not contribute in phase. It should be noted that this reduction is necessary in order to create a uniform amplitude over a broad azimuthal angle.

Now consider the observation point, $Q_b$, near the vertical axis. The distance from this point to an end stave is greater than the distance to the center stave by an amount $$\Delta 1_b = R(l - \cos \phi/2) \cos 0 = \Delta l_a \cos \theta$$

even though $\Delta 1_a$ might be greater than many wavelengths, $\Delta 1_b$ will be less than a quarter wavelength for values of $\theta$ near 90°, and the energy contribution from all the staves will be in phase at $Q_b$. The fact that the individual energy contributions add with equal phases at angles near 90°, and add with unequal phases in the horizontal plane, causes the vertical side lobe levels of the entire array to be significantly greater than the corresponding side lobe levels for each individual stave.

Figure 4:
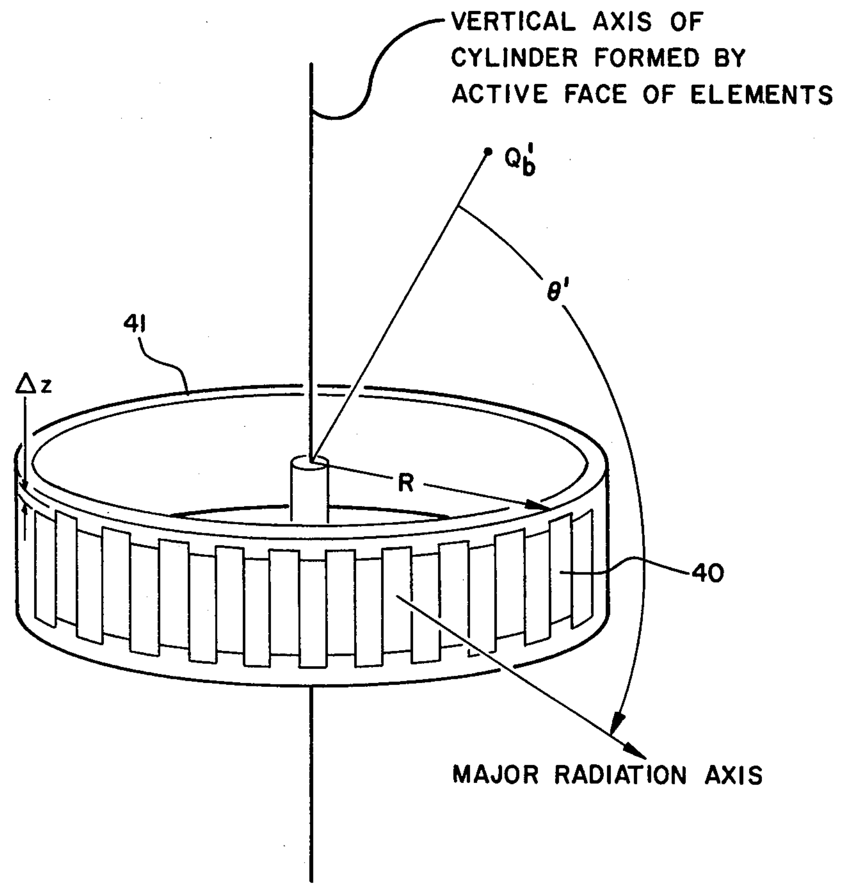
FIG. 4 is a perspective view of a staggered stave cylindrical array radiator according to the present invention.

FIG. 4 illustrates a cylindrical array radiator which will eliminate these undesirable vertical side lobes. A plurality of staves 40 on the face of the cylindrical housing 41 are staggered in the vertical direction by an amount $\Delta z$. This causes the distance from each stave to $Q_b'$ to be unequal to the distance from the adjacent stave to $Q_b'$. The difference, $\Delta 1_c$ in distances from a pair of adjacent staves to $Q_b'$ is:

$$\Delta 1_c = \Delta z \sin \theta'.$$

If each individual stave has an undesirable side lobe at the angle $\theta'$, then $\Delta z$ is chosen such that:

$$\Delta z \sin \theta' = \Delta 1_c = \lambda/2,$$

where $\lambda$ is the wavelength of the radiated energy. If $\Delta z$ is chosen such that $\Delta 1_c = \lambda/2$, then the relative distance from the point $Q_b'$ to adjacent staves is a half wavelength. Consequently, the energy contributions from any two adjacent staves will be 180° out of phase at $Q_b'$ and will exactly cancel. This cancellation will eliminate the undesirable vertical side lobe.

A simple example will illustrate how the array of FIG. 4 is built. Suppose that a single test stave is constructed, and its vertical radiation pattern is measured. Further suppose that the single stave vertical radiation pattern exhibits an undesirable vertical side lobe centered at $\theta=90°$. For $\theta=90°$, $\Delta z=\lambda/2$. If every other stave is staggered by a half wavelength, then the energy contributions from each pair of adjacent staves will be 180° out of phase at $\theta=90°$, and the total pressure field will be zero at this angle.

Figure 5:
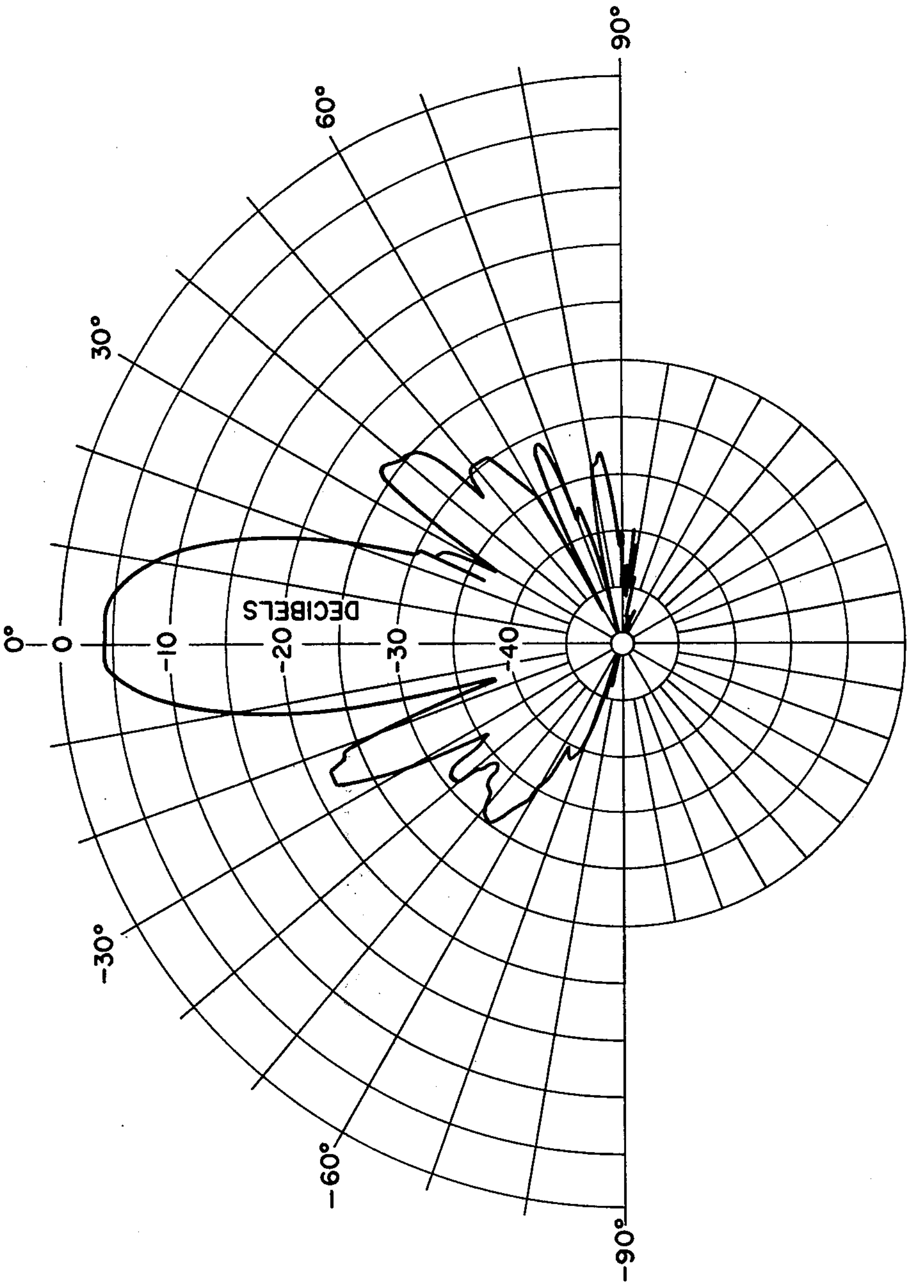
FIG. 5 is a plot of the vertical beam pattern of a staggered stave cylindrical array radiator according to the present invention.

FIG. 5 illustrates the measured vertical radiation pattern of a cylindrical acoustic array in which the staves were staggered by a half wavelength. The active angular aperture, $\phi$, was 133° and the radius of the cylinder was 14 wavelengths. Comparing FIG. 5 with FIG. 2 the improvement in vertical side lobe reduction is quite noticeable.

In some applications it might be useful to stagger the staves by an amount that changes from stave to stave. Suppose the individual stave radiation pattern exhibits undesirable side lobes at two angles, $\theta_1$ and $\theta_2$. Then half of the pairs of staves can be staggered by $\Delta z_1$ and the other half by $\Delta z_2$. The staggering distances $\Delta z_1$ and $\Delta z_2$ are given by:

$$\Delta z_1=\lambda/2 \sin \theta_1$$

$$\Delta z_2=\lambda/2 \sin \theta_2$$

This technique can be generalized to eliminate all undesirable vertical side lobes if the total number of staves is large enough.

The same technique can be used if it is desirable that the cylindrical array radiator operate at more than one frequency. If $\lambda_1$ and $\lambda_2$ are the wavelengths corresponding to two frequencies of operation, then half the pairs of staves can be staggered by $$\Delta z_1=\lambda/2 \sin \theta',$$

and the other half staggered by $$\Delta z_2=\lambda_2/2 \sin \theta'.$$

Again this technique can be generalized to allow operation over a broad range of frequencies.

The major advantages of the staggered vertical stave cylindrical array radiator are its simplicity of construction and its increased effectiveness. This radiator does not require a bulky and unpredictable baffle or large staves with complicated drive electronics. Furthermore, the present invention is a much more effective method of reducing energy radiated in the vertical direction.

What is claimed is:

1. A cylindrical array radiator comprising:

a cylindrical housing; and a plurality of staves arranged vertically adjacent each other on the circumference of said cylindrical housing to form an active aperture in the form of a sector of a cylinder, each of said staves being staggered alternately in a vertical direction from each adjacent stave by an amount necessary to eliminate undesirable side lobes.

2. A cylindrical array radiator as recited in claim 1 wherein the amount by which adjacent staves are staggered is determined by $\Delta z \sin \theta=\lambda/2$, where:

$\Delta z$=amount of stagger, $\theta$=angle of an undesirable side lobe relative to the horizontal maximum response axis of said radiator, and $\lambda$=wavelength of the radiated energy.

3. A cylindrical array radiator as recited in claim 2 wherein the amount by which adjacent staves are staggered is $\lambda/2$.

* * * * *